US012691364B2

(12) United States Patent
Guziel

(10) Patent No.: US 12,691,364 B2
(45) Date of Patent: Jul. 28, 2026

(54) LOTTERY GAME WITH A WORD ASSOCIATION GROUP PLAY STYLE

(71) Applicant: Paul Guziel, Lagrange, KY (US)

(72) Inventor: Paul Guziel, Lagrange, KY (US)

(73) Assignee: ALCHEMY3, LLC, Alpharetta, GA (US)

( * ) Notice: Subject to any disclaimer, the term of this patent is extended or adjusted under 35 U.S.C. 154(b) by 230 days.

(21) Appl. No.: 18/426,204

(22) Filed: Jan. 29, 2024

(65) Prior Publication Data

US 2024/0181336 A1 Jun. 6, 2024

(51) Int. Cl.
*A63F 3/06* (2006.01)
*G07F 17/32* (2006.01)

(52) U.S. Cl.
CPC .......... *A63F 3/0665* (2013.01); *A63F 3/0645* (2013.01); *G07F 17/329* (2013.01)

(58) Field of Classification Search
CPC .............................. B43K 29/002; B42D 25/27
See application file for complete search history.

(56) References Cited

U.S. PATENT DOCUMENTS 6,241,246 B1 * 6/2001 Guttin .................. A63F 3/0665 273/272
7,377,512 B2 * 5/2008 Brickwood ........... A63F 3/0665 283/903
7,458,580 B2 12/2008 Martineck et al.
7,601,059 B2 * 10/2009 Bozeman ................ G07F 17/32 273/272
9,633,520 B2 * 4/2017 Bennett, III ......... G07C 15/006
10,173,126 B2 * 1/2019 Brouillard ............. G07F 17/329
11,896,914 B2 * 2/2024 Lucci .................... G07F 17/329
2001/0040341 A1 * 11/2001 Kamille ................ A63F 3/0665 273/138.1
2014/0175745 A1 * 6/2014 Noval ................... A63F 3/0423 273/272
2021/0077898 A1 * 3/2021 Jackson ................ A63F 3/0665
2024/0017158 A1 * 1/2024 Mendoza ............. A63F 3/0665

OTHER PUBLICATIONS

"Cashword", "Mississippi Lottery Corporation, How to Play", screenshot of video posted on YouTube no later than Oct. 2, 2023, pertinent screenshot attached, accessed Jan. 6, 2025. (Year: 2023).*
Cashword Lottery (Year: 2023).*

* cited by examiner

*Primary Examiner* — Omkar A Deodhar
(74) *Attorney, Agent, or Firm* — Lucas & Mercanti, LLP

(57) ABSTRACT

A lottery game play style that extends the entertainment value of both physical printed and virtual digital lottery products through application of a word association group four puzzle layer of the game play. A four-column grid with a number of rows forming a plurality of squares, each containing a word and a corresponding prize value. The player can play out the word association group four puzzle by selecting four like words and revealing a common pattern identifier by either removing printed material from a scratch-off printed ticket embodiment, marking on a terminal generated printed ticket or playing out on a computer device for a digital lottery ticket play. Players can extend their lottery game experience by first trying to solve the word association puzzle, then applying the corresponding prize values to the results of the group puzzle to reveal if the game is a winning ticket.

15 Claims, 10 Drawing Sheets

LOTTERY GAME WITH A WORD ASSOCIATION GROUP PLAY STYLE

BACKGROUND OF THE INVENTION

The invention relates to lottery products of variable output terminal printed draw games, pre-determined outcome scratch-off games, and digital play lottery games sold by government regulated lottery agencies, specifically lottery games styled as 'word association' games, and methods of playing same.

In a typical scratch-off lottery game, a player purchases a physical pre-printed scratch-off lottery game card with outcomes hidden by a layer of overprint material that can be revealed by removing with a scratching motion. The same form of the scratch off ticket can also be achieved digitally using a smart phone, tablet or computer, whereby hidden outcomes are revealed by touching the screen or point and click with a cursor. If these exposed areas reveal a specific outcome or pattern, the player can win a primary prize from the game prize pool structure. If the player does not win a primary prize, the game play value could be extended by offering another chance to win in a secondary prize pool. This could be delivered as another random chance to win from the same purchased ticket by activating a digital second chance game and applying a drawing entry after entering the unique serial number from the ticket into an internet hosted entry site.

In lottery game tickets, there are icons that represent play symbols. In a "Match-Style" game play, you need to match 'like symbols' to complete a set and there would be an associate PRIZE awarded for completing that set. In some game play styles, you need to match a set of 'like PRIZE values' to determine a prize.

As additional entertainment value, a game play method could be applied to the lottery ticket or game that does not impact the prize outcome, but extends the experience for the player. Applying a word association puzzle play style to the game delivers this type of added value.

SUMMARY OF THE INVENTION

The word association game play is for entertainment value only and does not impact the prize outcome. Lottery tickets are a non-skill based game of chance with randomly assigned prize outcomes. However, lottery tickets are also a form of gaming entertainment and can incorporate skill-based game play to extend the entertainment value, as long as it doesn't affect the prize award outcome of the game ("extended game play"). This word association game play provides that extended play entertainment value to each of the different lottery game product types.

In this invention, we would employ the method of matching 'like PRIZE values' to determine the prize as the extended play value involves matching words that share a commonality in a skill-based format for entertainment purposes only.

One embodiment provides a physical scratch-off lottery game card with a 4×4 matrix word association puzzle. This card has a substrate with the same 4×4 grid printed on the top of the substrate. One word is printed in each of the sixteen different squares, and the same word is printed in the same location on the scratch off material covering those words. The squares are distributed in a 4×4 matrix. When the squares with the words are uncovered, the printed area under the scratch off material reveals the matching word association groups of four by using one of the common imaging methods below:

a. One such embodiment would group each set of four squares by sharing the same printed background color. One set of four associated words would have a green background. One set of four associated words would have a yellow background. One set of four associated words would have a blue background. One set of four associated words would have a pink background.
b. One such embodiment would have a group key number or symbol to match each set of four words into the word association group.
c. One such embodiment would have a one-color unique pattern printed in the background of each set of four squares to match the four words into a word association group.

In this method, the non-skill prize outcome is pre-determined by printing four (4) 'like PRIZE values' within one matching set of four word association groups.

Another embodiment provides the extended play value on a terminal generated draw game style lottery product. This product differs from the aforementioned 'scratch off lottery game card' by not hiding any of the play area with any removable printed material. Terminal generated games are printed on demand from a closed-network retail lottery terminal as single-color variable data images on a thermal transfer paper or dot-matrix imaging system. The non-skill based pre-determined prize outcome on this type of game ticket would be a match 4 like prize amounts in a word group and win that prize. As this product does not have a player operated reveal method, the word association extended play value would be hidden by a code printed on the lottery game ticket.

a. One such embodiment could encapsulate the word association puzzle reveal groups in a printed **2*d*** barcode format (QR Code, Datamatrix, PDF417), allowing the player to try to solve the puzzle on the printed ticket and then scan the reveal barcode with a scanner enabled mobile device app that can display the answers on the device.
b. One such embodiment would be to print an exposed match key table or legend under the puzzle area with symbols printed under each of the 16 words that map to the four explained word association groups in the legend.

A final embodiment provides for a digital lottery game version, in some lottery jurisdictions referred to as iLottery games. These lottery game tickets provide the same government regulated legal requirements as the previous game examples of non-skill based, pre-determined prize outcomes with each play. However, these games have the added benefit of being distributed electronically on internet enabled computer devices (i.e. laptops, mobile phones, tablet computers) via web browsers and mobile apps. This allows for more multimedia features than a printed lottery ticket can provide, in the form of full color motion images, sound effects, music and animated player graphic UI/UX (user interface, user experience). This makes the word association extended game play experience more entertaining giving the player more hints and chances to group the words, without fully revealing the answers. And the pre-determined prize outcome could be more prominently displayed with end of game callout messaging, to avoid any confusion. A control link button will always be visible in the game to REVEAL PRIZE, giving the player the opportunity to skip the extended play entertainment value and reveal the pre-determined outcome of the game ticket.

a. One such embodiment of the extended play would provide a web application game with a 4×4 color grid displaying 16 different words, one in each square of the grid. As the player clicks or taps a word, it highlights in a "selected" state. Once four words are Selected, the application will either animate the group as correct and move to the top of the screen also displaying a PRIZE value under each word. If all 4 PRIZE values in that group match, that prize is awarded in the game ticket. If the selected group is incorrect, the app will display an error message that it was an incorrect group, deselect all the selections and instruct the player to try again.

Other advantages and features of the present invention will become apparent after review of the hereinafter set forth Description of the Drawings, Detailed Description of the Invention, and the Claims. Objects, features and advantages of the present invention will be apparent upon reading the following detailed description in conjunction with the drawings and the appended claims.

BRIEF DESCRIPTION OF THE DRAWINGS

FIG. 2 illustrates the scratch-off game card of FIG. 1 with covered area revealed illustrating the first embodiment option a.

DETAILED DESCRIPTION

A word association group four game ('Word Association Group') involves a table of four columns and an equal or greater number of rows, typically four, to generate a matrix where each cell can house a single word. In a 4×4 matrix example, 16 different words would be randomly placed in the 16 cells. Prior to placing the words in each cell, they are assembled into sets or groups of four that have a common pattern, association or relationship, and that result answer key is hidden from the player. The words are then randomly applied to each of the cells in the matrix to scramble the order of the groups, creating a challenge for the player to re-group them in their word association order. When a player correctly selects and groups four words into a correct association, the result key is revealed to validate the correct group. Certain embodiments of this style of game play are distributed digitally in mobile device applications and html web browser-based software applications. This invention proposes a way of applying this style of game play for both printed and digital lottery game products.

By definition a government regulated lottery game involves a game of chance by which the outcome cannot be determined with any application of skill. While this invention involves a puzzle game play that can provide an advantage to players more skilled in the game style, the play style does not have any impact on the random outcome applied to the lottery game in determining a win. This play style adds a layer of entertainment value for the lottery purchaser that desires additional game play before revealing the outcome.

At any time, the purchaser can expose the outcome of the game by scratching off all the removable material without engaging in the play style for entertainment value. A game ticket win status can be determined by asking an authorized lottery retailer to check the ticket, or by using any available 'ticket checking' devices or applications provided by the lottery.

Revealing the win or no-win outcome of the lottery game employing the word association group play style involves two levels of grouping.

a. First is revealing the correct groups of four words mapped to their GROUP KEY. In the example of a 4×4 matrix, there would be 4 groups of 4 words each associated to 1 of 4 pre-determined groups.

b. Once the groups of four have been revealed, the PRIZE within each group must be identical to win that PRIZE. For example, if all four words in GROUP 1 have a PRIZE amount of $5 below each word within that cell, then that is a $5 PRIZE win outcome.

Figure 1:
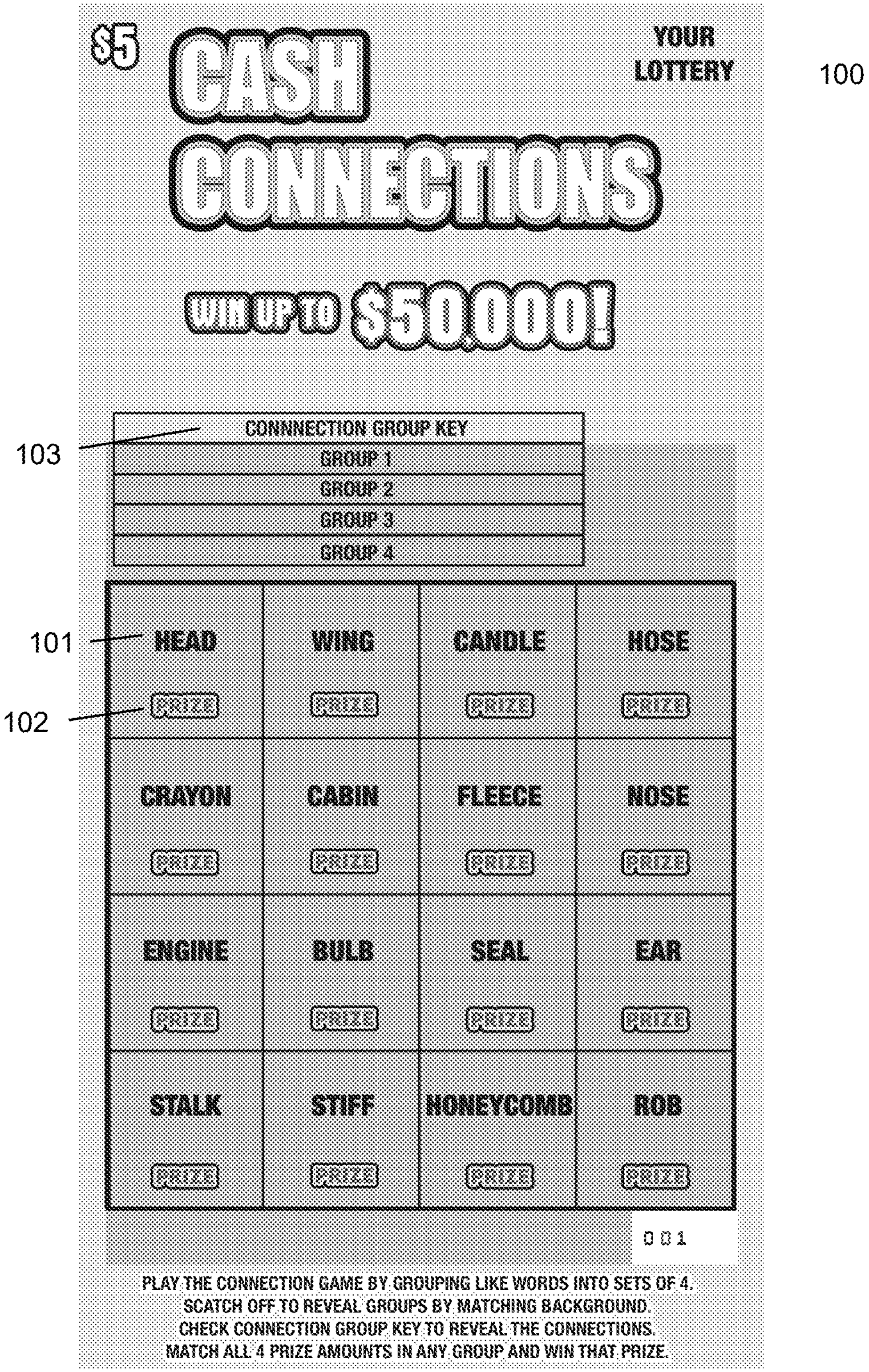
FIG. 1 illustrates a covered scratch-off word association matching game card with extended game play according to a first embodiment of the invention.

The first embodiment of the invention is applied to a multi layered, commercial printing press method of printing secure lottery game tickets commonly referred to as scratch-off tickets ('scratch-off tickets') where a printed game card starts with a flat substrate upon which a grid of sixteen (16) squares is printed in a 4×4 matrix. The substrate may be of suitable card stock material on which printing can be received, generally of paper. The squares are populated with a combination of words, symbols and prize descriptions typically formatted as USD currency amounts. This initial printing layer holds the variable data outcome of the game that is randomly generated by software applications and imaged in an initial stage of the printing process. After which a layer of removable material, typically latex, is applied over the outcome imaging to mask the results until the player removes the layer by scratching off the material. An identical 4×4 matrix is imaged on the removeable layer in the same position as the first image, positioning the 16 words in the same location, masking the PRIZE outcome with a repeating single word PRIZE. This guides the player to the area under the removable material where the random prize values will be visible. FIG. 1 illustrates a lottery game card 100 for a scratch-off 4×4 matrix word association group four style game, with the removable material covering the outcome layer.

The randomly arranged single words are printed one to each cell 101 in the grid, with the repeating common word PRIZE 102 printed below, to indicate where the variable data outcome prize value will be printed underneath. The lottery game card also includes a masked GROUP KEY table 103 above the 4×4 matrix of a single column with 4 rows, each labeled GROUP 1, GROUP 2, GROUP 3, GROUP 4.

Figure 2:
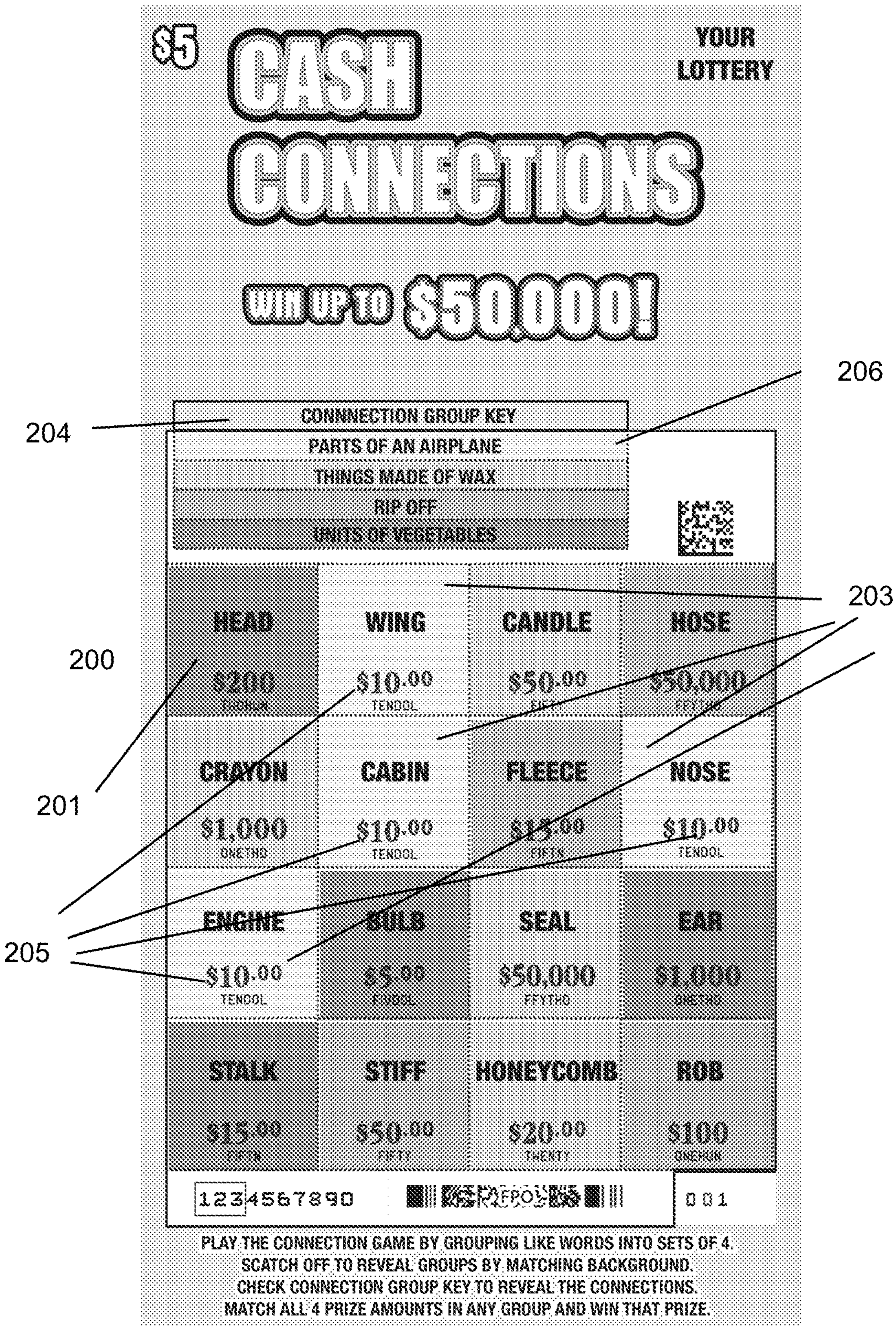

After a player purchases a lottery game card, the player may play out the word association game by guessing a first set of four words on the grid, and scratching off the removeable material in just those four cells. Each different embodiment of the scratch-off game application allows for a different method of mapping the groups under the scratch off material. FIG. 2 illustrates an answer matrix with squares uncovered 200. Each set of four words are grouped by a unique color background 201 applied in the initial printing stage along with the variable outcome data. Once the removeable material is scratched off to reveal each cell, the player will know that they grouped all four correctly by the common unique background color for those four words 203. Any words that have a different background color are not part of the same GROUP. The group is confirmed when the player scratches the removable area in the corresponding GROUP KEY 204 to reveal the same group background color. If the corresponding PRIZE values match in all four cells in a single group, the player wins a prize associated with that pattern. FIG. 2. Illustrates a $10 PRIZE win scenario 205 by having the same $10 PRIZE value under each of the four words in GROUP 1 that share the unique background color. The word association KEY for GROUP 1 is "PARTS OF AN AIRPLANE" 206 and the four words in the group are WING, CABIN, NOSE and ENGINE, each with the PRIZE amount of $10.00 below the word within the cell.

Alternatively, the player can select to first scratch-off one or all of the GROUP KEY values to provide a hint as to which words should be grouped together. Then try to group the words in the grid. At any point the player can scratch off all the material to reveal the outcome and determine if they won a prize.

Figure 3:
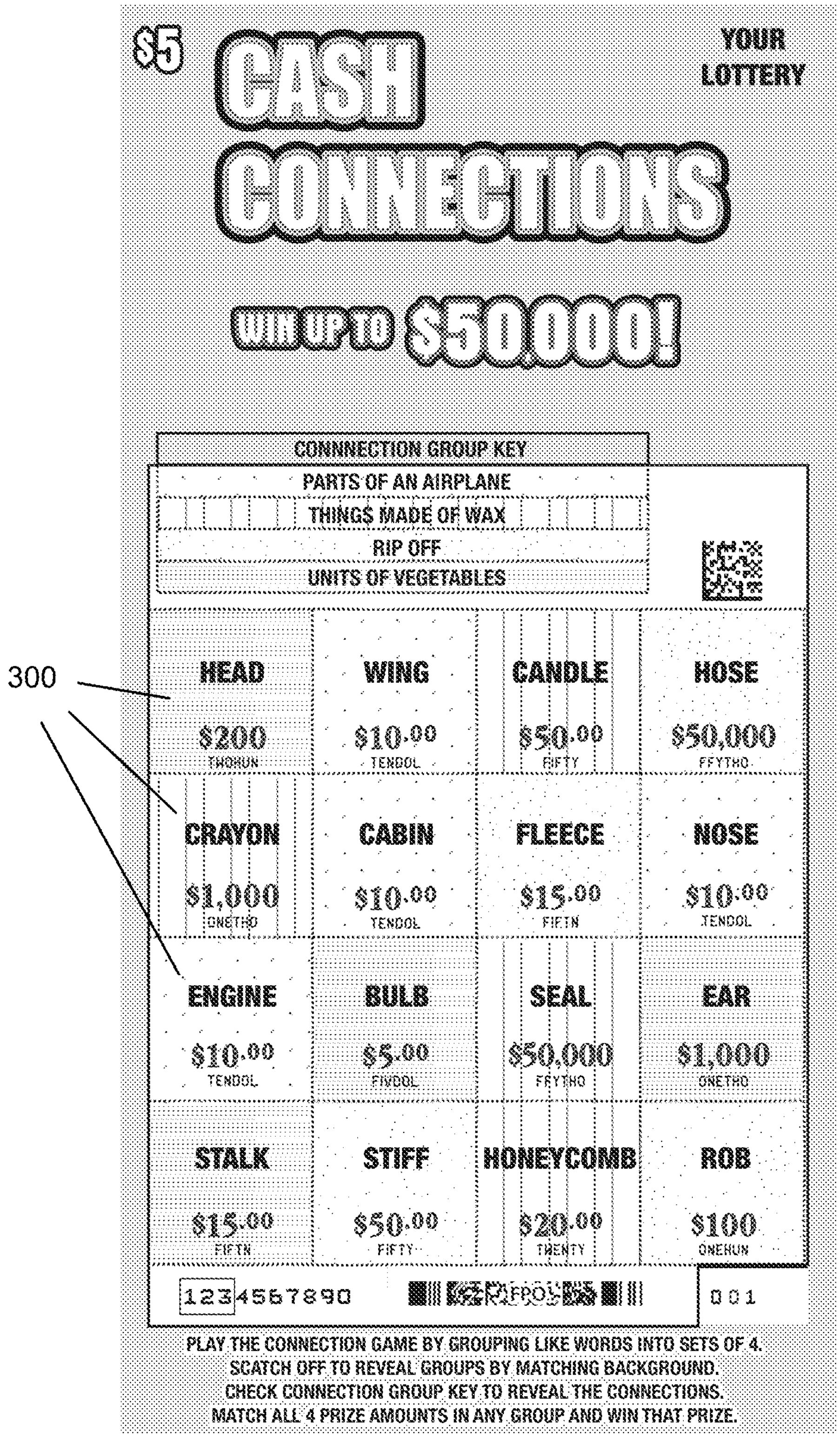
FIG. 3 illustrates the scratch-off game card of FIG. 1 with covered area revealed illustrating the first embodiment option b.

FIG. 3 illustrates another embodiment of the process for scratch off lottery game card in FIG. 1. In this embodiment the word association groups are mapped by a common one-color background pattern 300 printed in tandem with the variable outcome layer under the removeable material. This provides for an alternative to the previous embodiment if color imaging is not available for the printing process. As in the first embodiment, the player can scratch off individual cells to reveal the word, prize and pattern. If their subsequent selections reveal the same unique printed background pattern, they can confirm that is a correct group. If the corresponding PRIZE values match in all four cells in a single group, the player wins a prize associated with that pattern.

Figure 4:
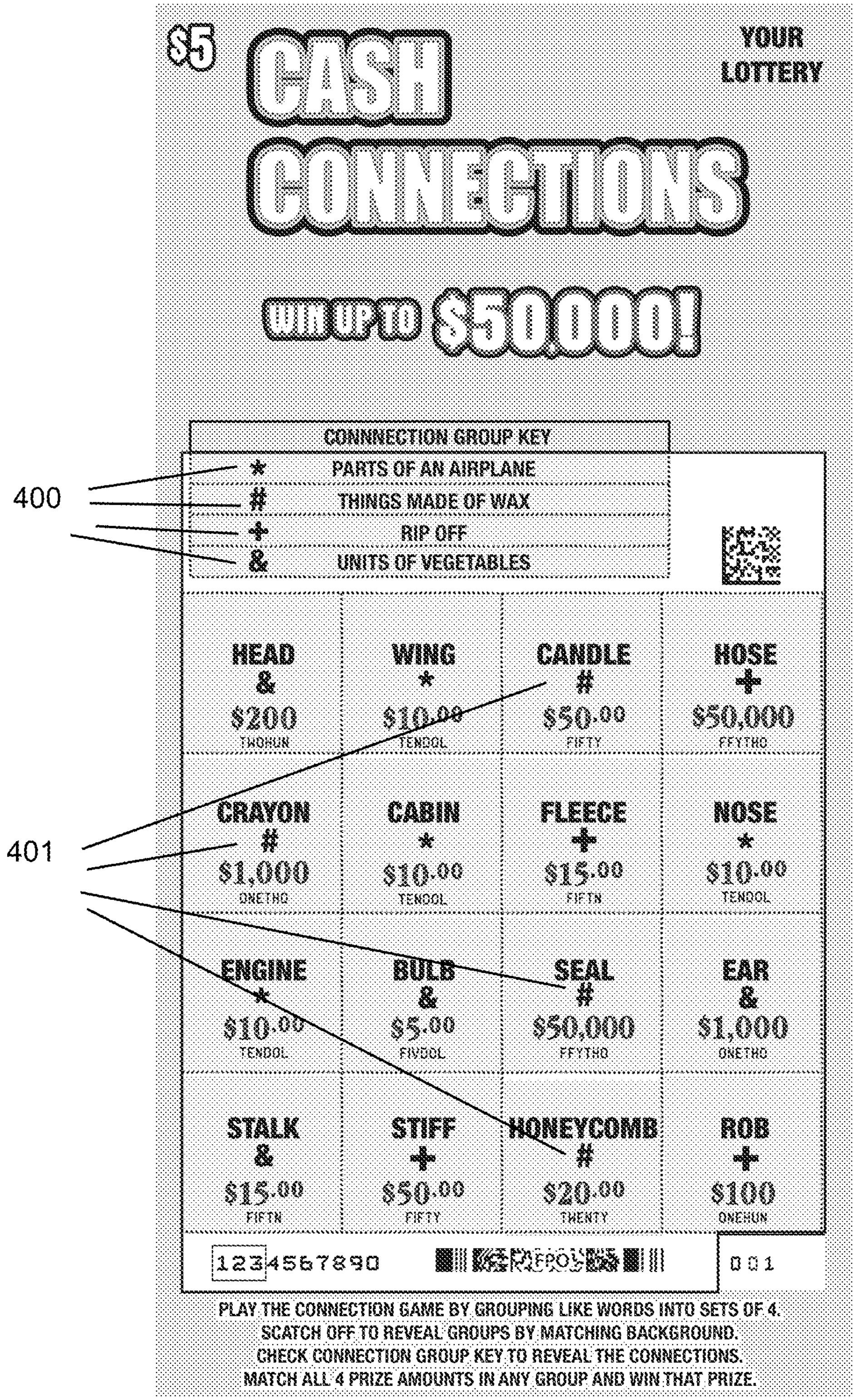
FIG. 4 illustrates the scratch-off game card of FIG. 1 with covered area revealed illustrating the first embodiment option c.

FIG. 4 illustrates another embodiment of the process for scratch off lottery game card in FIG. 1. In this embodiment the word association groups are mapped by a common hidden SYMBOL 400 printed in tandem with the variable outcome layer under the removeable material. This provides for an alternative to the previous embodiment if a unique background imaging process is not desired. As in the first embodiment, the player can scratch off individual cells to reveal the word, prize and SYMBOL. If their subsequent selections reveal the same unique SYMBOL pattern 401, they can confirm that is a correct group. If the corresponding PRIZE values match in all four cells in a single group, the player wins a prize associated with that pattern.

Briefly defined, terminal generated lottery games are printed on demand from a closed-network retail lottery terminal as single-color variable data images on a thermal transfer paper or dot-matrix imaging system. Contrast to previous embodiments, this eliminates the possibility of masking an outcome and does not allow for any color imaging. The game of chance random win or no win outcomes are generated by a central computer draw system within the network operated by a contracted lottery system vendor.

Figure 5:
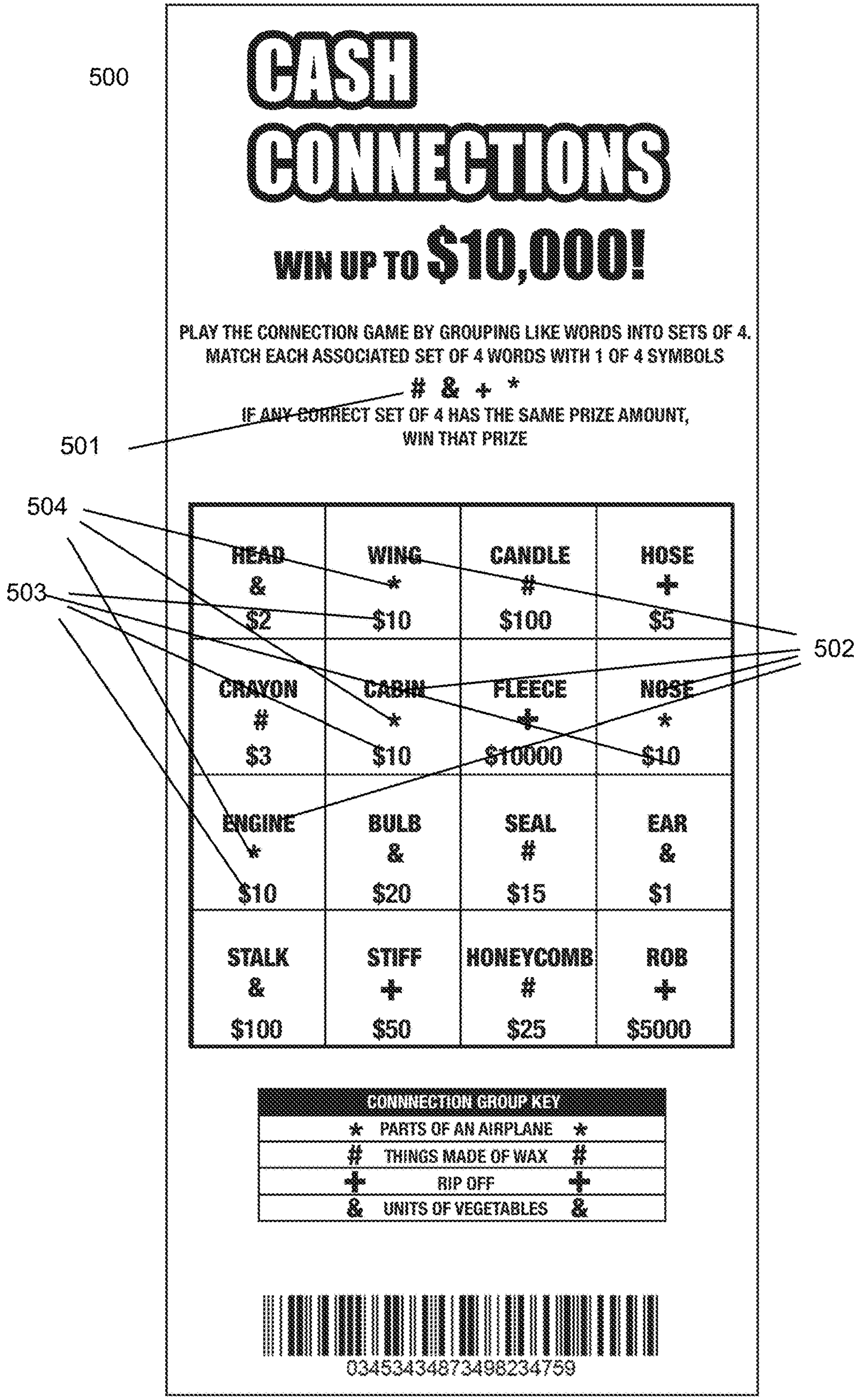
FIG. 5 illustrates the terminal generated printed word association matching game card with extended game play option a according to the second embodiment of the invention.

FIG. 5 illustrates a terminal generated draw game embodiment of the invention 500. When a player purchases the game, the lottery terminal images the word association group play style grid onto the ticket in random order. To facilitate the GROUP KEY patterns, the terminal can apply a similar method as FIG. 4, by placing a common SYMBOL within the cell along with the word 501. The player can play out the word association game play style by selecting the words 502 and then checking by matching four like symbols 503. The GROUP KEY is printed below the game board and the player can reference the key validate the groups. If the corresponding PRIZE values match in all four cells in a single group, the player wins a prize associated with that pattern. FIG. 5 illustrates a $10 win 503 outcome as the GROUP 1 pattern of 4 matching*symbols 504 have the same $10 PRIZE amount in the cell 503.

At any time, the purchaser can expose the outcome of the game without engaging in the play style for entertainment value. A game ticket win status can be determined by asking an authorized lottery retailer to check the ticket, or by scanning the ticket serial number barcode with any available 'ticket checking' devices or applications provided by the lottery.

Figure 6:
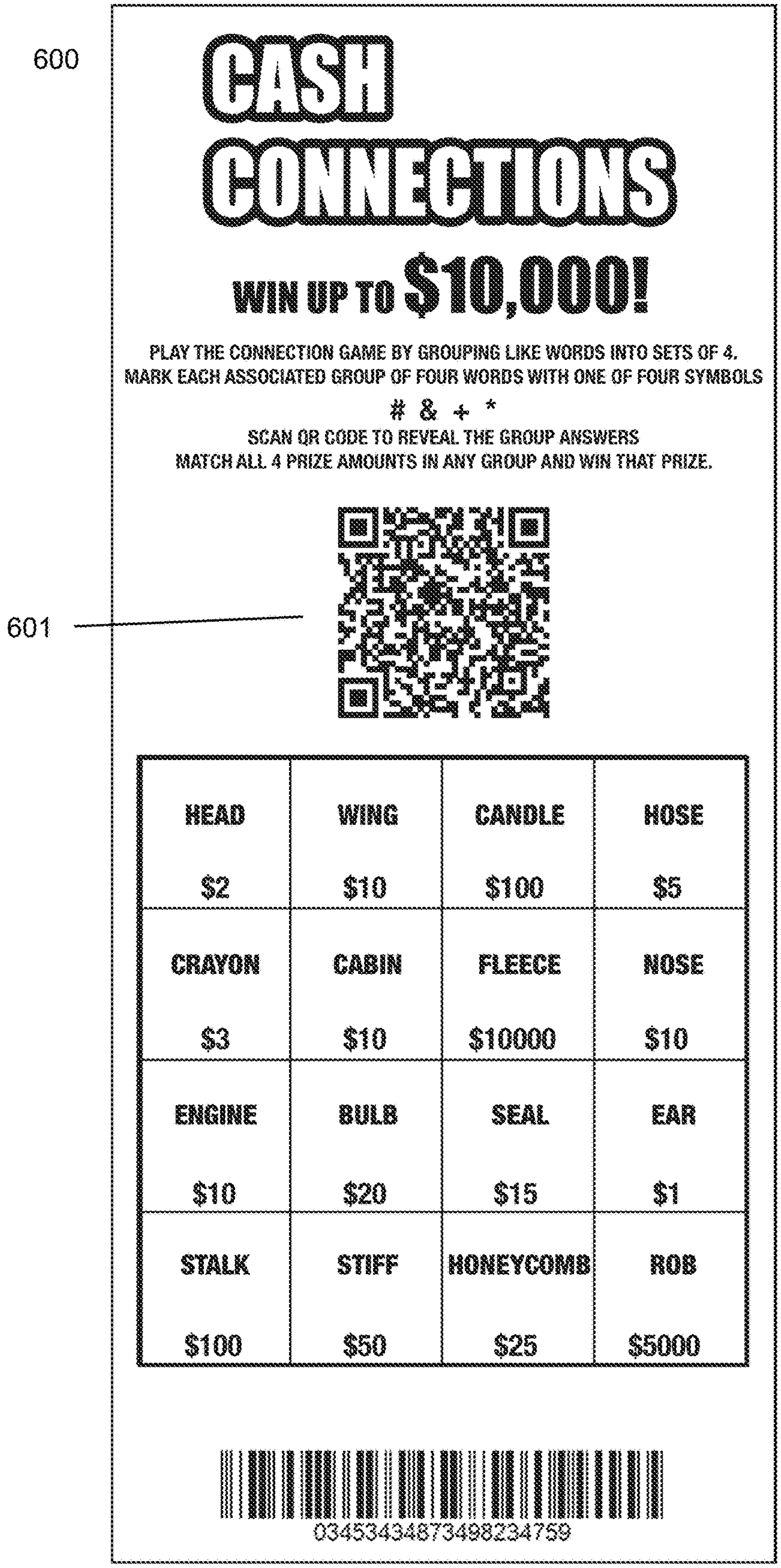
FIG. 6 illustrates the terminal generated printed word association matching game card with extended game play option b according to the second embodiment of the invention.

Another embodiment of the terminal generated lottery game product can mask the outcome of the word game by encapsulating the word association group puzzle results and GROUP KEY in a 2d barcode 600. This method provides for more of a challenge and surprise reveal of the word association entertainment play value within the game by not exposing the patterns on the printed ticket at time of purchase. FIG. 6 illustrates one such embodiment using a QR Code style 2d barcode 601. This symbology could either a. encapsulate all the puzzle results that can be revealed using a mobile device or other camera enabled device with a standard barcode scanner application or,
b. store a URL that when exposed by an internet-enabled device with a barcoded scanner, can redirect the user to a website that more graphically displays the game play results. This method could also extend the game play by generating the puzzle on a website with multimedia capabilities allowing for a more interactive user experience, similar to the next embodiment of the invention.

Briefly defined, Digital Lottery Games, also known as iLottery Games, share the same pre-determined, randomly generated outcome, no-skill games of chance as Scratch-Off games and Terminal Generated Draw games, with a few advantages. Digital lottery games have the added benefit of being distributed electronically on internet-enabled computer devices (i.e. laptops, mobile phones, tablet computers) via web browsers and mobile apps. This allows for more multimedia features than a printed lottery ticket can provide, in the form of full color motion images, sound effects, music and animated player graphic UI/UX (user interface, user experience).

Figure 7:
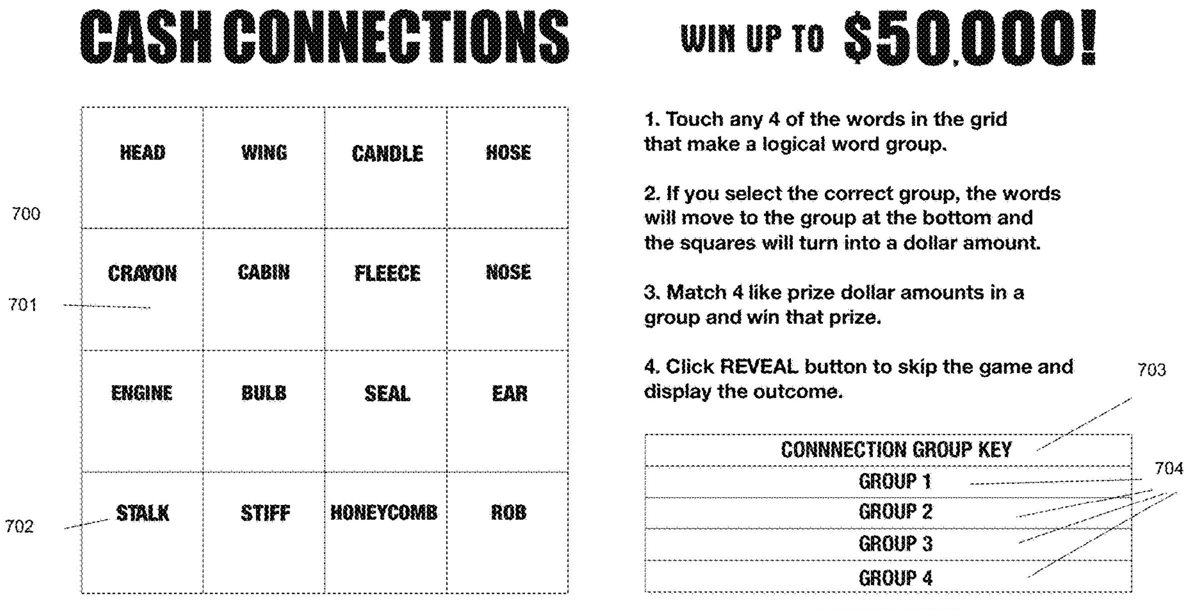
FIG. 7 illustrates the digital lottery game play word association matching UI with extended game play according to the third embodiment of the invention.

One final embodiment of the invention allows for the game play style to be applied to Digital Lottery games or iLottery product. FIG. 7 illustrates an example of a simple digital game UX 700 generated after the player process of purchasing a digital lottery game instance of this type. The player device displays the word association game grid 701 in a more simplified format than previous embodiments, only including the single word in each cell 702. Also displayed is a masked table of the GROUP KEY 703, listing out each of the different Groups 704 that are to be revealed after the player successfully completes each four word association in the game matrix.

Figure 8:
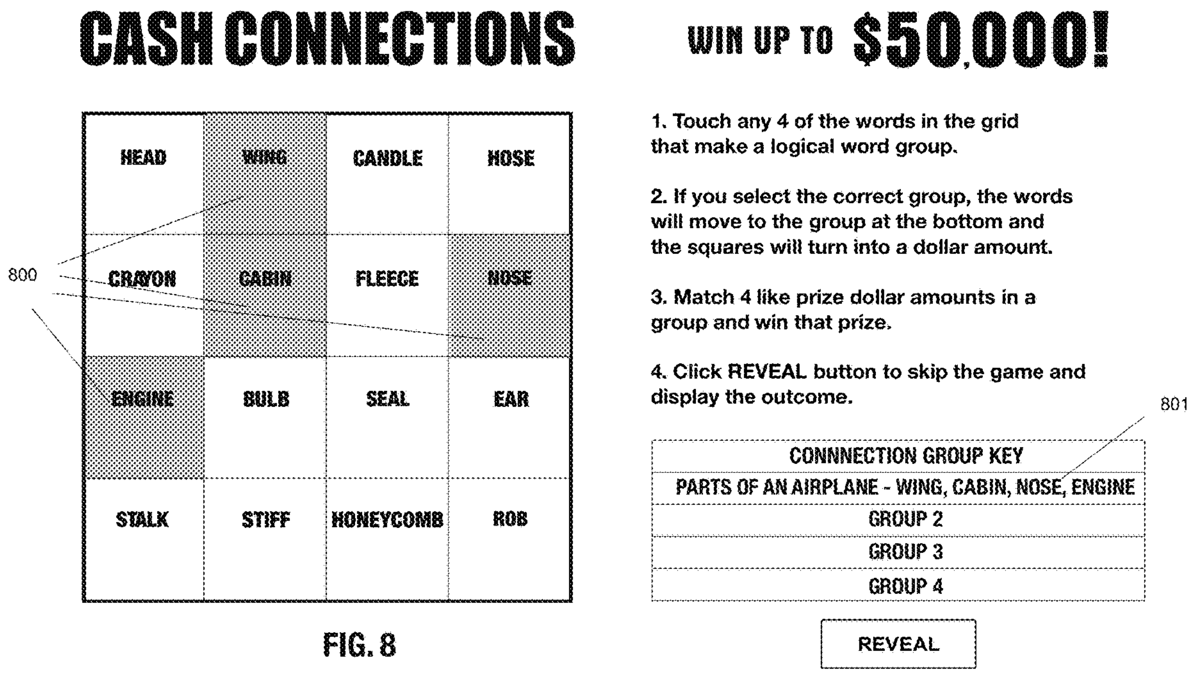
FIG. 8 illustrates the digital lottery game play of FIG. 7 after the player select stage of the third embodiment of the invention.

FIG. 8. illustrates a selection of four words from the grid after a player clicks or touches each square 800 with the computer input device (i.e. mouse, touch-screen, etc.) from the embodiment in FIG. 7. The 'selected' cell is highlighted by a background color and the player is allowed to select four cells before the application evaluates the group. If the player selects the correct group of four cells, the application will expose the corresponding GROUP in the GROUP KEY legend 801 on the right, displaying the associated answer. The example in FIG. 8 shows a successful grouping of GROUP 1 801 being 'PARTS OF AN AIRPLANE=WING, CABIN, NOSE and ENGINE'. The successful matching group of four tiles will remain highlighted in the group color for a moment, and then the words will convert to PRIZE amounts in each tile.

Figure 9:
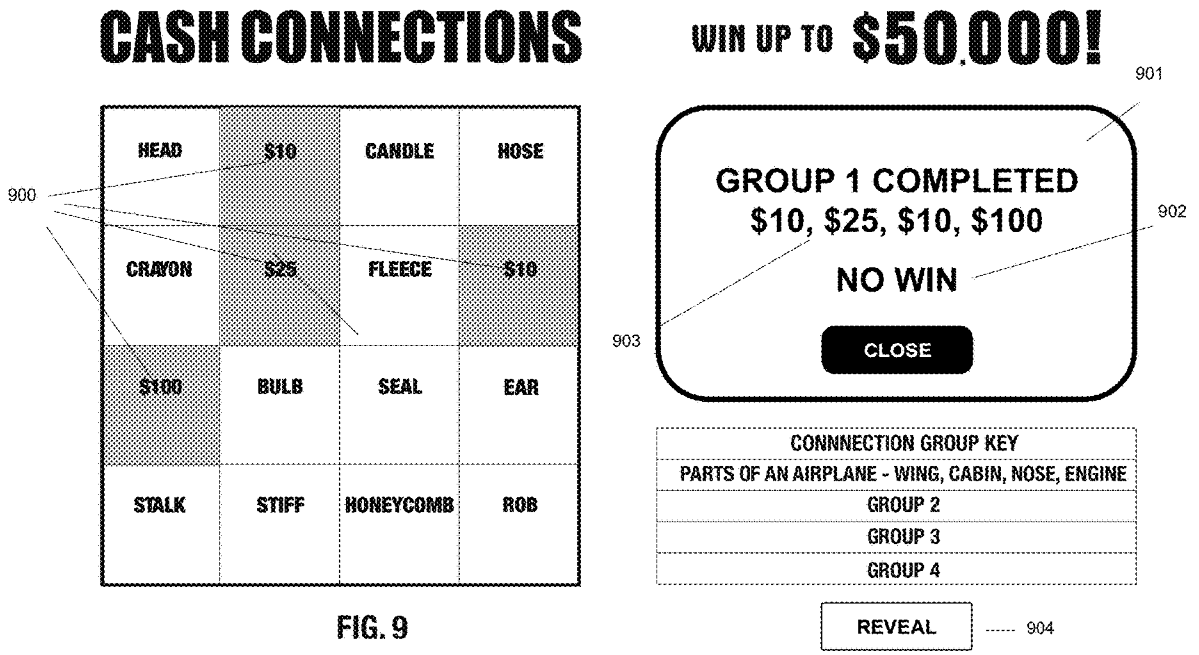
FIG. 9 illustrates the digital lottery game play of FIG. 7 at the completion of a group match illustrating an example of a NO WIN outcome in the third embodiment of the invention.

FIG. 9. Illustrates the PRIZE amount reveal of each cell in a correct group 900. The application will then display a dialog box message 901 aggregating all the PRIZE amounts and alerting the player if it is a WIN or NO-WIN outcome 902. In FIG. 9 the example is showing PRIZE amounts for GROUP 1 as $10, $25, $10 and $100 903. Since these are not four matching prize amounts in the group, this is a NO WIN outcome. The player can complete the three other groups to reveal if they are WIN or NO WIN outcomes.

At any time, the purchaser can expose the outcome of the game without engaging in the play style for entertainment value. In the digital lottery game embodiment of the invention, there is a REVEAL button 904 on every screen of the application. If the player selects this button, the game will automatically animate through all the group associations, exposing all the PRIZE amount groups and possible WIN and NO WIN outcomes.

Figure 10:
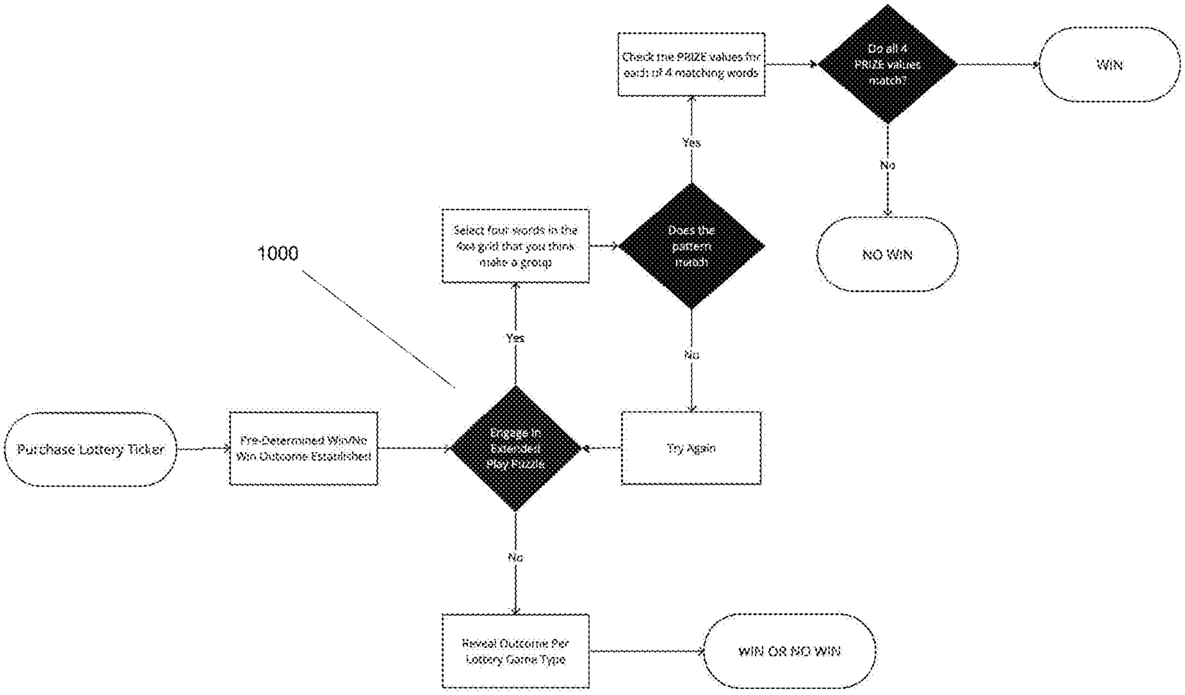
FIG. 10 is a flow chart for the extended game play process.

FIG. 10 is a flow chart mapping out the player journey for purchasing and engaging in the word association group four play style 1000 in the process of playing the lottery game with a chance to win prizes. The player purchases a play of one of the different lottery game type embodiments. At the point of purchase, the outcome of that lottery game has been pre-determined before the player reveals any outcomes. Once the ticket is purchased, the player can opt to engage in the extended play style to try to solve the puzzle before revealing the pre-determined prize outcome. If the player chooses to extend the play experience, they make the choices associated with the word association match four game. The associated game play outcomes are revealed according to game type. The PRIZE outcomes are revealed at this time and the player can analyze the results to see if they won a PRIZE. If a player opts to not extend the play experience, they can reveal the outcome of any game using the reveal method for that game type.

While the embodiments and its subparts, as outlined in this application are understood to be the most applicable to this invention, it is possible that these may be enhanced and further embodiments formed by those having the benefit of using the descriptions and drawings utilized herein to which this patent should encompass. Furthermore, while specific terms are used herein and in the claims provision, they are not meant to limit the invention in any way or the claims as set forth below.

What is claimed is:

1. A scratch-off lottery game with a word association group play style, comprising:

a. printed variable generated game play data on a substrate;

b. a puzzle game play grid of cells arranged in columns and rows, a plurality of single words, each being placed inside a cell of the grid and cataloged in sets, the words of each set of the sets having a predefined pattern, and each cell having an identifier indicating an associated set of the sets to which the word of the each cell belongs, the identifier being hidden by a removable material;

c. each cell also contains a printed prize value hidden by the removable material;

d. a corresponding printed group answer key legend with a plurality of group association answers that indicate which words in the grid form which sets, the answer key legend hidden by the removable material;

e. wherein the plurality of cells with the words form a word association group puzzle, and if the words grouped in one of the sets bear the same printed prize value, that prize is awarded to a player holding the lottery game card;

f. wherein the player can play the word association group puzzle by scratching off the removable material of a group of cells and determining whether the group of cells is one of the sets having a predefined pattern based on the identifier in each cell of the group of cells; and g. wherein a player can bypass the word association group puzzle by scratching off the removable material of all of the cells and determining whether any of the sets of words listed in the group answer key legend bear the same printed prize value.

2. The scratch-off lottery game card of claim 1, wherein the predefined pattern being a word association group scheme.

3. The scratch-off lottery game card of claim 1, wherein the identifier of each of sets is a common printed background color within each of cells of the each of the sets.

4. The scratch-off lottery game card of claim 1, wherein the identifier of each of sets is a common printed background pattern within each of cells of the each of the sets.

5. The scratch-off lottery game card of claim 1, wherein the identifier of each of sets is a common printed corresponding symbol within each of cells of the each of the sets.

6. The scratch-off lottery game card of claim 1 has a predetermined prize outcome that is identified as a group of the same printed prize value within any of the sets.

7. A method for playing a scratch-off lottery game in which a scratch-off game card with a grid of cells is presented to a player, each cell being filled with a word, an identifier of a set to which the word belongs, and prize value, the words being cataloged into sets, the words of each set having a predefined pattern, and all cells being covered by a removable material and thus forming a word association group puzzle, the scratch-off lottery game further comprising a table of Group Key answers initially covered by the removable material, the method comprising the steps of:

a. playing the word association group puzzle by removing, by a player, the removable material in a sequence of a group of cells with words that are deemed to bear a logical association and determining whether the group is a set by the identifiers;

b. determining whether the lottery game is a winner by exposing the common group pattern for each of the groups and the corresponding prize within each cell;

c. removing the removable material in the group key table;
d. exposing the answers to the puzzle; and
e. determining if like prize amounts are in any of the confirmed word association groups.

8. A terminal generated lottery game with a word association group play style, comprising:
a. printed variable generated game play data on lottery ticket stock;
b. a puzzle game play grid of cells arranged in columns and rows, a plurality of single words, each being placed inside a cell of the grid and cataloged in sets, the words of each set of the sets having a predefined pattern, and each cell having an identifier indicating an associated set of the sets to which the word of the each cell belongs;
c. each cell also contains a printed prize value;
d. a corresponding printed group answer key legend with a plurality of group association answers that indicate which words in the grid form which sets, wherein the plurality of group association answers is hidden in a 2D barcode and exposed using a camera enabled mobile device with a barcode scanner application; and
e. wherein the plurality of cells with the words form a word association group puzzle, and if the words grouped in one of the sets bear the same printed prize value, that prize is awarded to a player holding the lottery game ticket;
f. wherein the player can play the word association group puzzle by selecting a group of cells and determining whether the group of cells is one of the sets by exposing the group association answers; and
g. wherein a player can bypass the word association group puzzle by selecting all of the cells and determining whether any of the sets of words bear the same printed prize value based on the exposed group association answers.

9. The printed lottery game ticket of claim 8, wherein the predefined pattern being a word association group scheme.

10. The terminal generated printed game ticket of claim 8, wherein the each of the sets being cataloged by a common printed corresponding symbol within each of cells including the words of the one of the sets.

11. A method for playing a terminal generated lottery game in which a ticket with a grid of cells presented to a player, each cell being filled with a word and prize value forming a word association group puzzle, the words being cataloged in sets, the words of each set having a predefined pattern, and the terminal generated game further comprising a table of Group Key answers hidden in a 2d barcode that is exposable using a camera enabled mobile device with a barcode scanner application, the method comprising the steps of:
a. playing the word association group puzzle by grouping, by a player, the words to collect a group that is deemed by the player to bear a logical association and determining whether the group is a set by exposing the 2d barcode;
b. determining whether the lottery game is a winner by identifying a common group pattern for each of the groups and the corresponding prize within each cell;
c. comparing the grouped words to group key answers of the puzzle; and
d. determining if like prize amounts are in any of the confirmed word association sets.

12. A digital lottery game with a word association group play style, comprising:
a. variable generated game play data displayed on a computer device;
b. a puzzle game play grid of cells arranged in columns and rows, a plurality of single words, each being placed inside a cell of the grid and cataloged in sets by graphical user interface, the words of each set having a predefined pattern;
c. each cell also contains a prize value;
d. a corresponding group answer key legend with a plurality of group association answers that indicate which words in the grid form which sets; and
e. wherein the plurality of cells with the words form a word association group puzzle, and if the words grouped in one of the sets bear the same prize value, that prize is awarded to a player;
f. wherein the player can play the word association group puzzle by selecting a group of cells and the computer device indicating whether the group of cells is one of the sets; and
g. wherein the player can bypass the word association group puzzle by selecting a reveal feature and determining whether any of the sets of words bear the same printed prize value based on the revealed sets.

13. The digital lottery game product of claim 12, wherein the predefined pattern being a word association group scheme.

14. The digital lottery game product of claim 12, wherein the predefined pattern being the words that share an association.

15. A method for playing the digital lottery game in which a computer generated display of a grid of cells is presented to a player, each being filled with a word forming a word association group puzzle, the words being cataloged in sets, the words of each set having a predefined pattern the digital game further comprising a table of Group Key answers, the method comprising the steps of:
a. playing the word association group play by selecting, by the player, the words to collect a set a group that bears a logical association and the computer generated display indicates whether the group is one of the sets;
b. playing the lottery game by selecting a reveal feature that identifies each of the sets using the Group Key answers;
c. comparing the grouped words to group key answers of the puzzle; and
d. displaying the corresponding prize amounts in the completed group and awarding a prize if all four prize amounts are the same.

* * * * *